US010160337B2

United States Patent
Kim et al.

(10) Patent No.: US 10,160,337 B2
(45) Date of Patent: Dec. 25, 2018

(54) LOW VOLTAGE DC-DC CONVERTER OF ECO FRIENDLY VEHICLE

(71) Applicants: Hyundai Motor Company, Seoul (KR); Kia Motors Corporation, Seoul (KR)

(72) Inventors: Jee Heon Kim, Gyeonggi-Do (KR); Dong Jun Lee, Gyeonggi-do (KR); Gi Bong Son, Gyeonggi-do (KR); Won Kyoung Choi, Gyeonggi-Do (KR); Hyun Wook Seong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/193,276

(22) Filed: Jun. 27, 2016

(65) Prior Publication Data

US 2017/0144556 A1 May 25, 2017

(30) Foreign Application Priority Data

Nov. 25, 2015 (KR) ........................ 10-2015-0165682

(51) Int. Cl.
*B60L 1/00* (2006.01)
*B60L 3/00* (2006.01)
*H02G 3/00* (2006.01)
*B60L 11/18* (2006.01)
*H02M 3/04* (2006.01)
*H02P 27/08* (2006.01)

(52) U.S. Cl.
CPC ....... *B60L 11/1811* (2013.01); *B60L 11/1803* (2013.01); *H02M 3/04* (2013.01); *H02P 27/08* (2013.01)

(58) Field of Classification Search
CPC ... B60L 11/1811; B60L 11/1803; H02M 3/04; H02P 27/08
USPC ......................................... 307/10.1
See application file for complete search history.

(56) References Cited

U.S. PATENT DOCUMENTS

| 7,782,027 B2 | 8/2010 | Williams |
| 2011/0121798 A1 | 5/2011 | Kitanaka |
| 2011/0176343 A1 | 7/2011 | Kojima |

(Continued)

FOREIGN PATENT DOCUMENTS

| JP | 2001-190031 A | 7/2001 |
| JP | 4880762 B2 | 2/2012 |

(Continued)

OTHER PUBLICATIONS

Decision to Grant dated May 22, 2017 in corresponding Korean Application No. 10-2015-0165682.

*Primary Examiner* — Carlos Amaya
(74) *Attorney, Agent, or Firm* — Mintz Levin Cohn Ferris Glovsky and Popeo, P.C.; Peter F. Corless (57) ABSTRACT

A low voltage DC-DC converter of an eco-friendly vehicle is provided. The converter includes an output current limit map applier that is configured to output an output current limit value using an output current limit map. A power controller is configured to amplify the output limit value output from the output current limit map applier to a predefined gain. Furthermore, an output limiter is configured to output the output limit value output from the power controller, and filter and output the output limit value after a predefined time lapses.

9 Claims, 6 Drawing Sheets (56) References Cited

U.S. PATENT DOCUMENTS

2013/0336032 A1* 12/2013 Ohshima ............. H02M 7/1626
363/89
2014/0197813 A1 7/2014 Umetani

FOREIGN PATENT DOCUMENTS

| | | |
|---|---|---|
| JP | 2014-138479 A | 7/2014 |
| KR | 10-2011-0025878 A | 3/2011 |
| KR | 10-2014-0016660 A | 2/2014 |
| KR | 10-2015-0071575 | 6/2015 |

\* cited by examiner

| | | INPUT VOLTAGE(Vin_map) | | | | | |
|---|---|---|---|---|---|---|---|
| | | 160 | 170 | 180 | 190 | 200 | 210 |
| OUTPUT VOLTAGE INSTRUCTION | 15.1 | 57 | 56 | 105 | 97 | 130 | 130 |
| | 15 | 57 | 56 | 105 | 102 | 130 | 130 |
| | 14.9 | 57 | 56 | 105 | 107 | 131 | 131 |
| | 14.8 | 57 | 56 | 105 | 112 | 132 | 132 |
| | 14.7 | 57 | 56 | 105 | 117 | 133 | 133 |
| | 14.6 | 57 | 56 | 105 | 122 | 134 | 134 |
| | 14.5 | 57 | 56 | 105 | 127 | 135 | 135 |
| | 14.4 | 57 | 56 | 105 | 132 | 135 | 135 |
| | 14.3 | 57 | 56 | 105 | 136 | 136 | 136 |
| | 14.2 | 57 | 56 | 105 | 137 | 137 | 137 |
| | 14.1 | 57 | 56 | 105 | 138 | 138 | 138 |
| | 14 | 57 | 56 | 105 | 139 | 139 | 139 |
| | 13.9 | 57 | 61 | 110 | 140 | 140 | 140 |
| | 13.8 | 57 | 66 | 115 | 140 | 140 | 140 |
| | 13.7 | 57 | 71 | 120 | 140 | 140 | 140 |
| | 13.6 | 57 | 76 | 125 | 140 | 140 | 140 |
| | 13.5 | 57 | 81 | 130 | 140 | 140 | 140 |
| | 13.4 | 57 | 86 | 135 | 140 | 140 | 140 |
| | 13.3 | 57 | 91 | 140 | 140 | 140 | 140 |
| | 13.2 | 57 | 96 | 140 | 140 | 140 | 140 |
| | 13.1 | 57 | 101 | 140 | 140 | 140 | 140 |
| | 13 | 57 | 106 | 140 | 140 | 140 | 140 |
| | 12.9 | 62 | 111 | 140 | 140 | 140 | 140 |
| | 12.8 | 67 | 116 | 140 | 140 | 140 | 140 |

FIG.4

| T$_{LDC}$ | 85 | 90 | 95 | 100 | 105 |
|---|---|---|---|---|---|
| I$_{o\_PC}$(%) | 1 | 0.6 | 0.3 | 0.3 | 0.3 |

LOW VOLTAGE DC-DC CONVERTER OF ECO FRIENDLY VEHICLE

CROSS-REFERENCE TO RELATED APPLICATION

This application is based on and claims the benefit of priority to Korean Patent Application No. 10-2015-0165682, filed on Nov. 25, 2015 in the Korean Intellectual Property Office, the disclosure of which is incorporated herein in its entirety by reference.

TECHNICAL FIELD

The present disclosure relates a low voltage direct current (DC)-DC converter of an eco-friendly vehicle, and more particularly, to a technology capable of improving driving performance of a vehicle by efficiently limiting an output of a low voltage DC-DC converter of an eco-friendly vehicle.

BACKGROUND

Typically, a general internal combustion engine vehicle uses fossil fuel such as gasoline, diesel, or the like and the fuel contributes to environmental pollution due to exhaust gas, global warming due to carbon dioxide, a cause of a respiratory disease due to an ozone generation. Further, a limited amount of the fossil fuel exists on the earth and may be exhausted. In order to solve the above-mentioned problems, eco-friendly vehicles such as an electric vehicle (EV) driven by driving an electric motor, a hybrid electric vehicle (HEV) driven by an engine and the electric motor, a fuel cell electric vehicle (FCEV) driven by driving the electric motor by power generated from a fuel cell, and the like have been developed.

Figure 1:
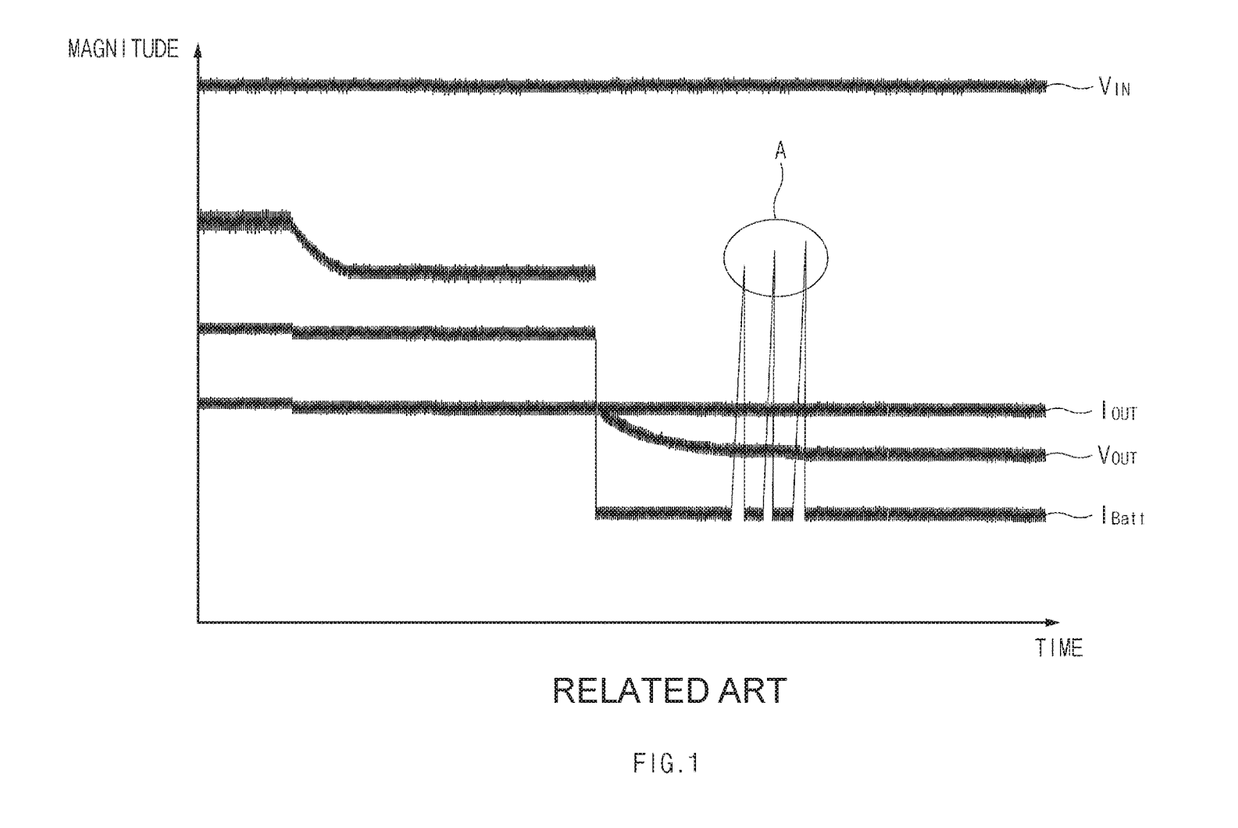
FIG. 1 is a graph illustrating an example in which an over-current occurs immediately after a driving of a general low voltage DC-DC converter of an eco-friendly vehicle according to the related art.

The above-mentioned eco-friendly vehicles, which are low-emission vehicles capable of minimizing an environmental problem and a problem of resource exhaustion, or zero emission vehicles capable of solving the above-mentioned problems, include an electric motor, a high voltage battery, a low voltage battery, a low voltage direct current (DC)-DC converter. When the low voltage DC-DC converter simultaneously performs a filtering during an initial driving as illustrated in FIG. 1, a de-rating response reaction is delayed and an over-current A occurs. When the low voltage DC-DC converter is shutdown due to the over-current, electronic loads are supplied with power through an auxiliary battery. However, when the auxiliary battery is fully discharged, the vehicle may be shutdown, thereby causing an accident.

SUMMARY

The present disclosure provides a low voltage DC-DC converter of an eco-friendly vehicle that may prevent shutdown of the low voltage DC-DC converter by efficiently limiting an output of the low voltage DC-DC converter even though an over-current occurs while driving the low voltage DC-DC converter.

Specifically, an aspect of the present disclosure may prevent the over-current at while improving responsibility by driving a pulse width modulation (PWM) controller during an initial driving of the low voltage DC-DC converter of an eco-friendly vehicle. Further, an output current ripple to supply power to electronic loads by driving the pulse width modulation (PWM) controller may be stabilized. A low pass filter (LPF) after a stabilization time (e.g., stabilization of a de-rating logic) of the PWM controller may protect the low voltage DC-DC converter and prevent a shutdown state thereof, to make it possible to secure the driving performance of the vehicle. According to an exemplary embodiment of the present disclosure, a low voltage DC-DC converter of an eco-friendly vehicle may include an output current limit map applier configured to output an output current limit value using an output current limit map, a power controller configured to amplify the output limit value output from the output current limit map applier to a predefined gain, an output limiter configured to output the output limit value output from the power controller, and filter. Further, the output limit value may be output after a period of time lapses.

The low voltage DC-DC converter may further include a counter configured to count when the power controller is driven and output a control signal to the output limiter when the predefined time lapses. The output limiter may include a current limiter configured to output a value which is equal to or less than 0 among the output current limit values output from the power controller, a filter configured to filter the value output from the current limiter, and a switch configured to output one of an output of the filter. Further, in response to the control signal output from the counter an output may be produced. Additionally, the filter may be a low pass filter.

The counter may be configured to perform the counting until the power controller is stabilized after the power controller is driven. A control signal to be output to the switch when the time in which the power controller is stabilized lapses. The counter may be configured to perform a control to enable the switch to select an output signal of the filter when the time in which the power controller is stabilized after the power controller is driven lapses. Additionally, the counter may be further configured to perform a control to enable the switch to select an output signal of the current limiter when the time in which the power controller is stabilized does not lapse. The power controller may have a gain of about 1.

The output current limit map applier may include a first mapper configured to output an output current limit value for each of an input voltage and an output voltage, a second mapper configured to output an output limit value based on a temperature change, a multiplier configured to multiply an output signal of the first mapper with an output signal of the second mapper, and a calculator configured to calculate an output signal of the multiplier and an output current sensed value. The low voltage DC-DC converter may further include a calculating device configured to calculate and output an output signal of the output limiter and an initial output voltage control signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some exemplary embodiments of the present disclosure will be described in detail with reference to the illustrative drawings. It is to be noted that in giving reference numerals to components of each of the accompanying drawings, the same components will be denoted by the same reference numerals even though they are shown in different drawings. Further, in describing exemplary embodiments of the present disclosure, well-known constructions or functions will not be described in detail in the case in which they may unnecessarily obscure the understanding of the exemplary embodiments of the present disclosure.

In describing the components of exemplary embodiments of the present disclosure, terms such as first, second, A, B, (a), (b), etc. can be used. These terms are used only to differentiate the components from other components. Therefore, the nature, order, sequence, etc. of the corresponding components are not limited by these terms. In addition, unless defined otherwise, it is to be understood that all the terms used in the specification including technical and scientific terms have the same meaning as those that are understood by those skilled in the art. It should be understood that the terms defined by the dictionary are identical with the meanings within the context of the related art, and they should not be ideally or excessively formally construed unless clearly defined otherwise in the present application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN.)

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
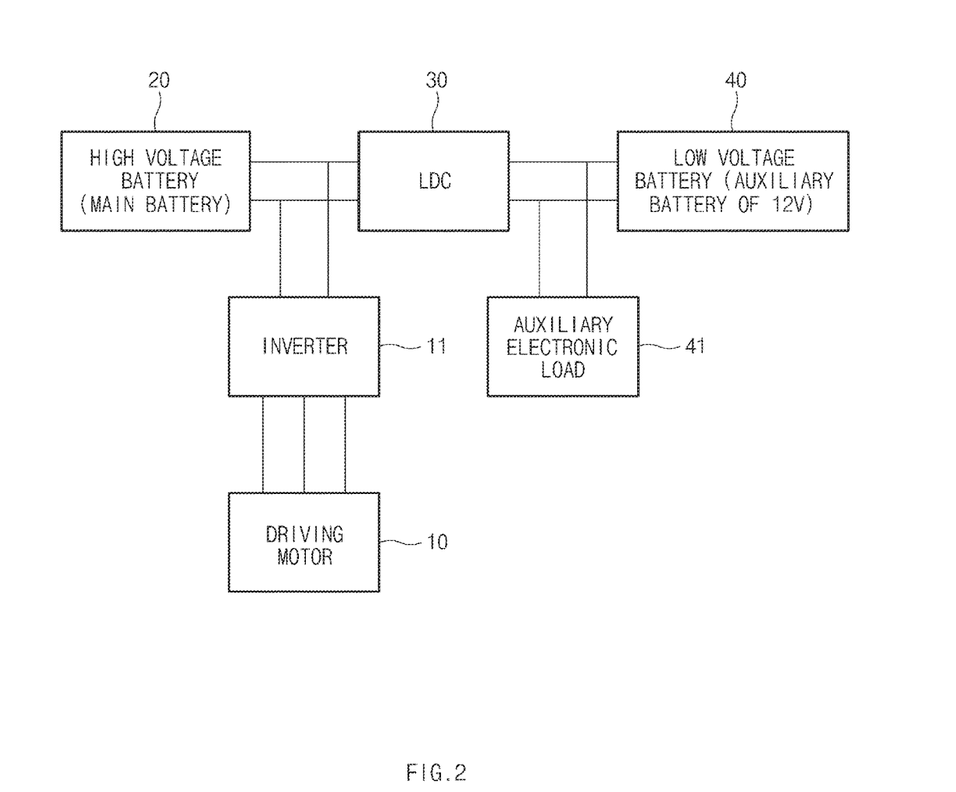
FIG. 2 is an exemplary detailed configuration diagram of an eco-friendly vehicle according to an exemplary embodiment of the present disclosure.

Hereinafter, exemplary embodiments of the present disclosure will be described in detail with reference to FIGS. 2 to 6. FIG. 2 is an exemplary detailed configuration diagram of an eco-friendly vehicle according to an exemplary embodiment of the present disclosure. Referring to FIG. 2, the eco-friendly vehicle according to an exemplary embodiment of the present disclosure may include an electric motor 10 configured to drive the vehicle, a high voltage battery 20 configured to store a charge to supply power to the electric motor 10 and an inverter 11 configured to rotate the electric motor 10. The eco-friendly vehicle may further include a low voltage DC-DC converter (LDC) 30 configured to perform a DC-DC power conversion between the high voltage battery 20, a low voltage battery (e.g., an auxiliary battery of about 12V), a low voltage auxiliary electronic load, the low voltage battery 40, and the auxiliary electronic load 41.

The electric motor 10 may include a driving motor configured to drive the vehicle. The inverter 11 may be configured to perform a phase conversion for the power supplied from the charger (e.g., a fuel cell) in response to a control signal applied from a controller that may be configured to drive the electric motor 10. The high voltage battery 20 may be used as a high voltage main power supply and may be configured to supply supplemental power to the electric motor 10, an air conditioner, a heater, and the like. The low voltage battery 40 may include an auxiliary power supply configured to supply 12V power and to supply the power to the low voltage electronic load 41 of the vehicle.

In the eco-friendly vehicle, the high voltage battery 20 and the low voltage battery 40 may be concurrently used.

In particular, when the power of the auxiliary battery 40 is insufficient, the power of the high voltage battery may be rectified and may be converted into direct current (DC) power using the low voltage DC-DC converter 30, and the auxiliary battery may be charged with the DC power. In other words, the low voltage DC-DC converter 30 may be configured to switch general DC power to be converted into alternating current (AC) power, and may be configured to perform a step-down for the AC power using a coil, a transformer, a capacitor, and the like. The AC power may be rectified and may be converted into DC power electricity may be supplied based on a voltage used in each of the electronic loads. In particular, the low voltage DC-DC converter 30 may be coupled directly between the high voltage battery 20 and the low voltage battery 40, which may be batteries of the vehicle, and may also be coupled to the electric motor 10 via the inverter 11. To prevent an occurrence of an over-current during an initial driving of the low voltage DC-DC converter 30, the low voltage DC-DC converter 30 may be configured to operate a power controller during the initial engagement, and then the power controller may operate together with a filter when the power controller is stabilized.

Figure 3:
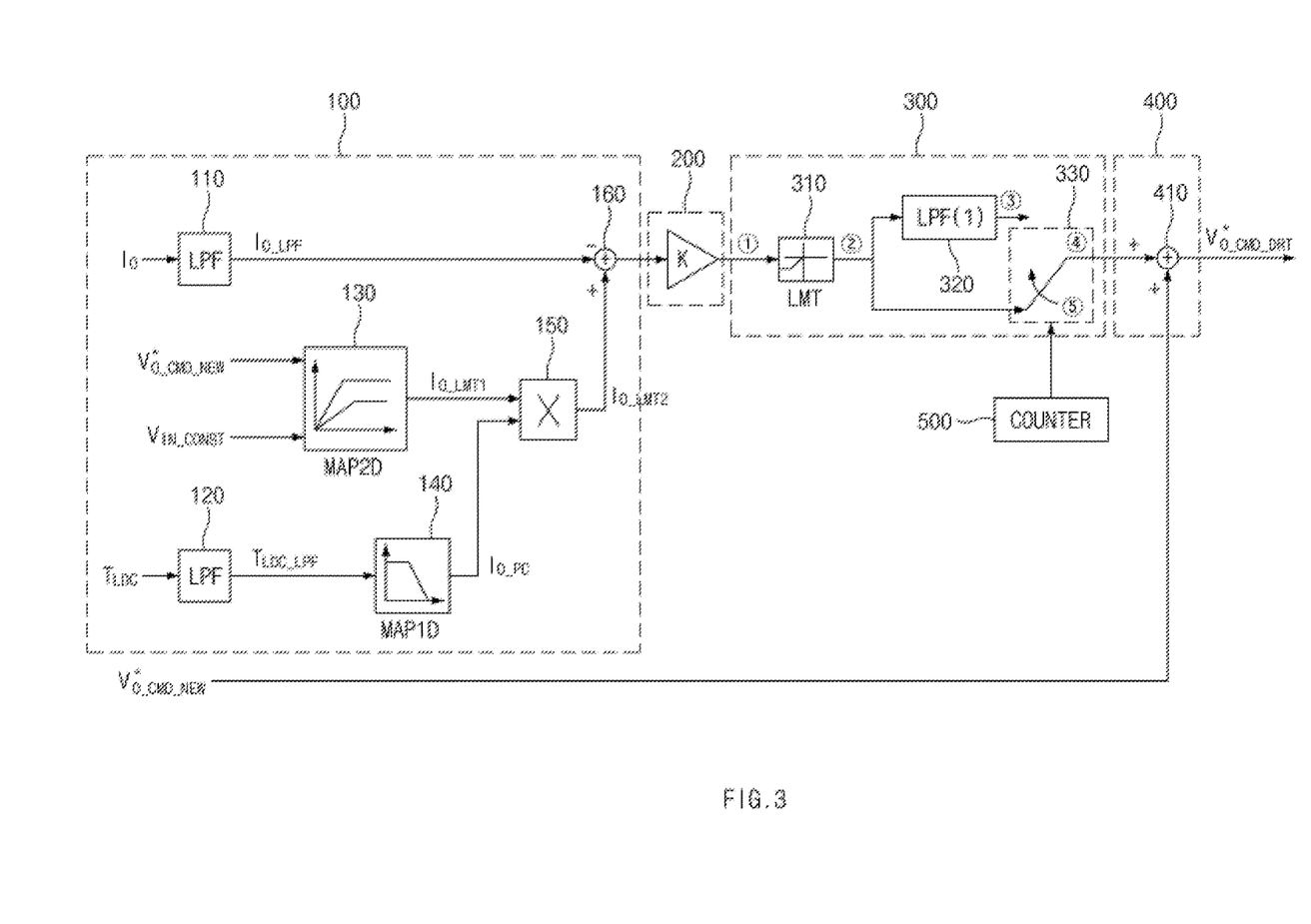
FIG. 3 is an exemplary detailed configuration diagram of a low voltage DC-DC converter of an eco-friendly vehicle according to an exemplary embodiment of the present disclosure.

FIG. 3 is an exemplary detailed configuration diagram of a low voltage DC-DC converter of an eco-friendly vehicle according to an exemplary embodiment of the present disclosure. The low voltage DC-DC converter according to an exemplary embodiment of the present disclosure may include an output current limit map applier 100, a power controller 200, an output limiter 300, a calculating device 400, and a counter 500. The output current limit map applier 100 may be configured to output an output current limit value via an output current limit map. For example, the output current limit map applier 100 may include filters 110 and 120, a fast mapper 130, a second mapper 140, a multiplier 150, and a calculator 160.

Figure 4:
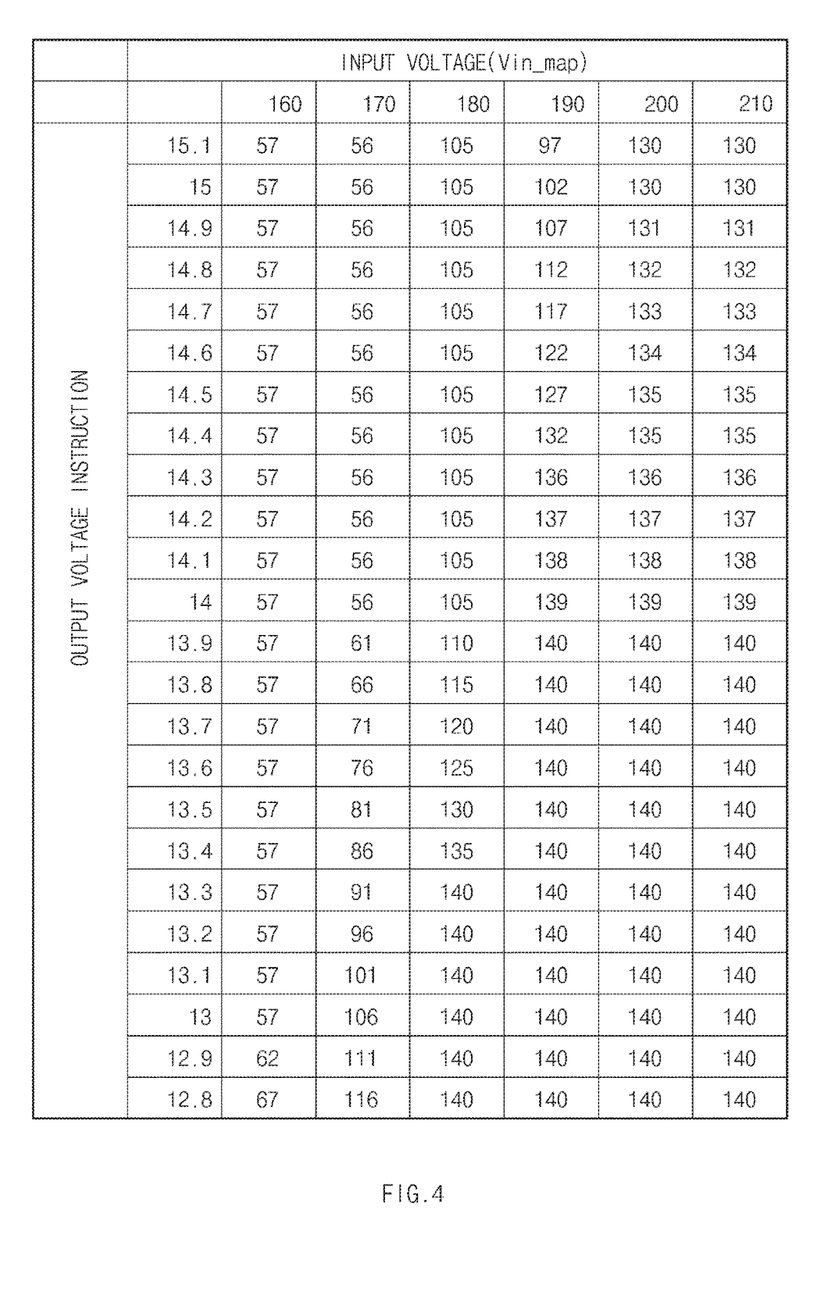
FIG. 4 is an exemplary illustration diagram of an output limit map used for the low voltage DC-DC converter of an eco-friendly vehicle according to an exemplary embodiment of the present disclosure.
Figure 5:
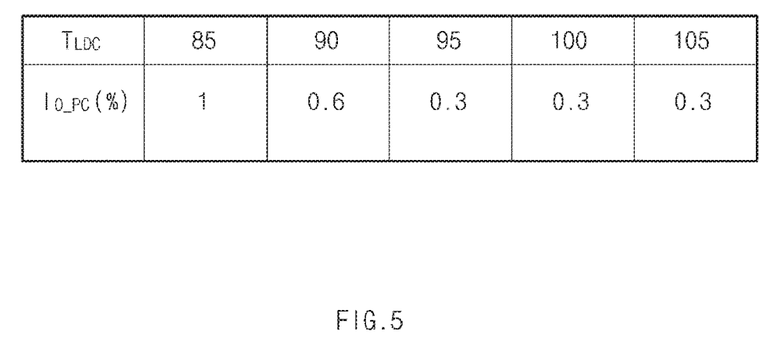
FIG. 5 is an exemplary illustration diagram of a temperature limit map used for the low voltage DC-DC converter of an eco-friendly vehicle according to an exemplary embodiment of the present disclosure.

The filter 110 may be a low pass filter and may be configured to filter an output current sensed value ($I_o$) and output an output current sensed and filtered value ($I_{o\_LPF}$). The filter 120 may be low pass filter and may be configured to filter a temperature sensed value ($T_{LDC}$) and output a temperature sensed and filtered value ($T_{LDC\_LPF}$). The first mapper 130 may be configured to receive an initial output voltage control signal ($V_{O\_CMD\_NEW}$) and an input voltage sensed value ($V_{IN\_CONST}$), and may be configured to output a current limit value ($I_{O\_LMT1}$) for each of an input voltage and an output voltage. In this case, an output current limit map applied to the first mapper 130 is illustrated in FIG. 4. The second mapper 140 may be configured to output an output current percentage value ($I_{O\_PC}$), which is a limit (e.g., about 0 to 1) based on the temperature, using the temperature sensed and filtered value ($T_{LDC\_LPF}$) output from the filter 120. In other words, a temperature limit map applied to the second mapper 140 is illustrated in FIG. 5.

The multiplier 150 may be configured to multiply the output current percentage value ($I_{O\_PC}$) with the output current limit value ($I_{O\_LMT1}$) and may further be configured to output an output current limit multiplied value ($I_{O\_LMT2}$). The calculator 160 may be configured to add the output current sensed and filtered value ($I_{o\_LPF}$) output from the filter 110 and the output current limit multiplied value ($I_{O\_LMT2}$) output from the multiplier 150. The power controller 200 may be configured to amplify a signal output from the calculator 160. However, when a gain of the power controller 200 is 1, the power controller 200 may be configured to correlate or match an output current and an output voltage control signal to correspond to each other at a ratio of 1:1. In particular, the power controller 200 may be configured to decrease the output voltage control signal of 1V per the output current of about 1 A.

The output limiter 300 may be configured to generate an output limit value output from the power controller 200 until a stabilization time of the power controller 200 during an initial operation of the low voltage DC-DC converter. The output limit value output from the power controller 200 may be filtered and output when the stabilization time of the power controller 200 lapses. In particular, the output limiter 300 may include a current limiter 310, a filter 320, and a switch 330. The current limiter 310 may be configured to output a value which is equal to or less than 0 among the output current limit values output from the power controller 200. The filter 320 may be configured to filter an output signal limited by the current limiter 310. Accordingly, the filter 320 may be configured to remove a ripple of the output signal. The switch 330 may be configured to select one of an output signal of the filter 320 and an output signal of the current limiter 310 in response to a control signal output from the counter 500.

The calculating device 400 may be configured to calculate the output signal selected by the switch 330 and an initial output voltage control signal ($V_{O\_CMD\_NEW}$). The counter 500 may be configured to perform a counting upon operation of the power controller 200, and may be configured to output the control signal to the output limiter 300 when a predefined time lapses. The counter 500 may be configured to perform the counting until stabilization of the power controller 200 after operation of the power controller 200, and outputs a control signal configured to operate the switch 330 based upon a lapse in the power controller 200 stabilization. In other words, the counter 500 may be configured to perform a control to engage the switch 330 to select the output signal of the filter 320 when the time in which the power controller 200 is stabilized after the power controller 200 operation lapses. Further, the counter 500 may be configured to operate the switch 330 to select the output signal of the current limiter 310 when the time in which the power controller 200 is stabilized does not lapse.

Figure 6:
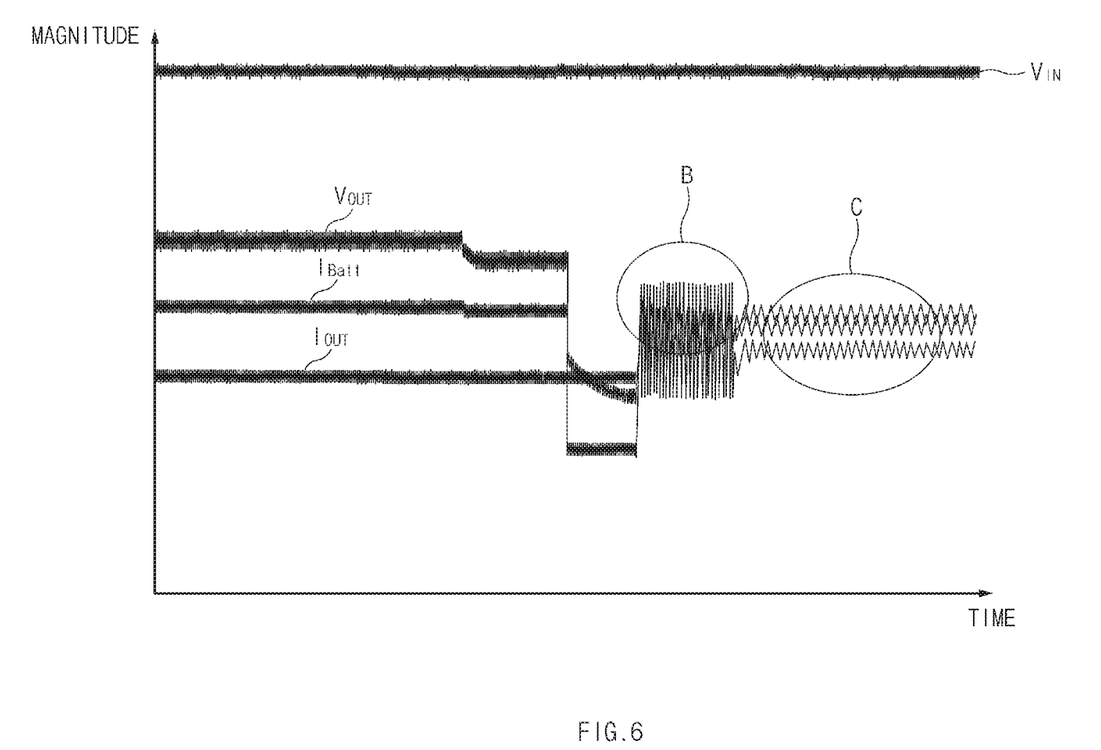
FIG. 6 is an exemplary graph illustrating an over-current prevention of the low voltage DC-DC converter of an eco-friendly vehicle according to an exemplary embodiment of the present disclosure.

According to the present disclosure, as illustrated in FIG. 6, the over-current may be prevented while improving responsibility by solely driving the power controller 200 (B) during an initial driving of the low voltage DC-DC converter. Further, the ripple of the output current may be stabilized to supply the power to the electronic loads by driving the power controller 200 and the filter 320 after the stabilization time (e.g., stabilization of a de-rating logic) of the power controller 200 (C). Accordingly, the low voltage DC-DC converter may be protected and a shutdown state may be prevented, thereby making it possible to secure driving performance of the vehicle. As described above, according to the exemplary embodiments of the present disclosure, the shutdown of the low voltage DC-DC converter may be prevented by efficiently limiting the output of the low voltage DC-DC converter even though the over-current occurs to the driving of the low voltage DC-DC converter, thereby making it possible to secure safety of the driving of the vehicle.

Hereinabove, although the present disclosure has been described with reference to exemplary embodiments and the accompanying drawings, the present disclosure is not limited thereto, but may be variously modified and altered by those skilled in the alt to which the present disclosure

What is claimed is:

1. A low voltage direct current (DC)-DC converter of an eco-friendly vehicle, comprising:
   an output current limit map applier configured to output an output current limit value using an output current limit map;
   a power controller configured to amplify the output limit value output from the output current limit map applier to a predefined gain; and
   an output limiter configured to output the output limit value output from the power controller, and filter and output the output limit value after a predefined time lapses.

2. The low voltage DC-DC converter according to claim 1, further comprising:
   a counter configured to count when the power controller is driven and output a control signal to the output limiter when the predefined time lapses.

3. The low voltage DC-DC converter according to claim 2, wherein the output limiter includes:
   a current limiter configured to output a value which is equal to or less than 0 among the output current limit values output from the power controller,
   a filter configured to filter the value output from the current limiter, and
   a switch configured to output one of an output of the filter and an output of the current limiter in response to the control signal output from the counter.

4. The low voltage DC-DC converter according to claim 3, wherein the counter is configured to perform the counting until a time in which the power controller is stabilized after the power controller is driven, and output a control signal configured to operate the switch when the time in which the power controller is stabilized lapses.

5. The low voltage DC-DC converter according to claim 4, wherein the counter is configured to operate the switch to select an output signal of the filter when the time in which the power controller is stabilized after the power controller is driven lapses, and is configured to operate the switch to select an output signal of the current limiter when the time in which the power controller is stabilized does not lapse.

6. The low voltage DC-DC converter according to claim 3, wherein the filter is a low pass filter.

7. The low voltage DC-DC converter according to claim 1, wherein the power controller has a gain of 1.

8. The low voltage DC-DC converter according to claim 1, wherein the output current limit map applier includes:
   a first mapper configured to output an output current limit value for an input voltage and an output voltage;
   a second mapper configured to output an output limit value based on a temperature change;
   a multiplier configured to multiply an output signal of the first mapper with an output signal of the second mapper, and
   a calculator configured to calculate an output signal of the multiplier and an output current sensed value.

9. The low voltage DC-DC converter according to claim 1, further comprising:
   a calculating device configured to calculate and output an output signal of the output limiter and an initial output voltage control signal.

* * * * *